(12) United States Patent
Yasuna et al.

(10) Patent No.: US 6,636,385 B2
(45) Date of Patent: Oct. 21, 2003

(54) MAGNETIC DISC APPARATUS HAVING ACTUATOR FOR HEAD POSITIONING MECHANISM

(75) Inventors: Kei Yasuna, Chiyoda (JP); Takashi Yamaguchi, Tsuchiura (JP); Tetsuya Hamaguchi, Chiyoda (JP); Keiko Watanabe, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 09/788,513

(22) Filed: Feb. 21, 2001

(65) Prior Publication Data

US 2001/0015876 A1 Aug. 23, 2001

(30) Foreign Application Priority Data

Feb. 23, 2000 (JP) .......... 2000-052095
Sep. 13, 2000 (JP) .......... 2000-283781

(51) Int. Cl.⁷ .................. G11B 5/55
(52) U.S. Cl. .................. 360/264.5; 360/294.3
(58) Field of Search .......... 360/264.5, 246.7, 360/78.12, 78.05

(56) References Cited

U.S. PATENT DOCUMENTS 4,395,742 A * 7/1983 Ostroff .......... 360/78.05

\* cited by examiner

*Primary Examiner*—A. J. Heinz
(74) *Attorney, Agent, or Firm*—Antonelli, Terry, Stout & Kraus, LLP

(57) ABSTRACT

Under existence of an impact and a vibration, a throughput and a reliability of a recording and reproducing operation in a magnetic disc apparatus are reduced. Accordingly, a mechanism for fixing a coarse moving actuator at an optional position is provided, at a time of following to a track, a motion of the coarse moving actuator is restricted and a positioning is performed by a fine moving actuator. Even when a vibration and an impact is applied from an external portion during the track following operation, it is possible to prevent the head position from being shifted and it is possible to perform a recording and reproducing operation. Further, it is possible to prevent adjacent data from being erroneously broken.

6 Claims, 16 Drawing Sheets

IN CASE OF ELECTRIC CURRENT 304-a
(LARGE ELECTRIC CURRENT)

IN CASE OF ELECTRIC CURRENT 304-b
(SMALL ELECTRIC CURRENT)

(a)

CROSS SECTION ALONG A-B

TRACK FOLLOWING TIME      TIME MOVING BETWEEN TRACKS

TRACK FOLLOWING TIME

TIME MOVING BETWEEN TRACKS

MAGNETIC DISC APPARATUS HAVING ACTUATOR FOR HEAD POSITIONING MECHANISM

BACKGROUND OF THE INVENTION

1. Field of the Invention

The present invention relates to a magnetic disc apparatus, a head positioning mechanism and a mobile information device provided with a magnetic disc apparatus.

2. Description of the Prior Art

In the conventional magnetic disc apparatus, there is provided with a lock mechanism for fixing a head as disclosed in Japanese Unexamined Patent Publication No. 7-130119 in order to improve a reliability with respect to an impact applied thereto at a non-operated time. On the contrary, with respect to a vibration and an impact applied from an external portion during recording and reproducing operations, in order to prevent data from being broken and being erroneously read due to the reason why the position of the head is shifted from a track, there are given a function of stopping the recording and reproducing operation when a shock sensor provided on a circuit board of the disc apparatus detects an impact and a function of monitoring a head position error signal for controlling the positioning so as to stop the recording operation when an amount of shift of the head from a center of the track becomes large.

Conventionally, a voice coil motor is generally used for an actuator moving a head positioning mechanism in the magnetic disc apparatus. The voice coil motor is excellent in response, however, has a problem that the voice coil motor is sensitive to the vibration and the impact applied from the external portion. For example, when an impact in a rotational direction is applied to the disc apparatus from the external portion, an acceleration in a rotational direction is generated in the head positioning mechanism corresponding to a movable portion relatively with respect to a disc apparatus casing and a disc. However, since the movable portion is not restricted in a rotational direction, an acceleration applied to the casing from the external portion becomes an acceleration for rotating the head positioning mechanism with respect to the casing. The acceleration generates a position shift from a target position of the head.

Accordingly, the magnetic disc apparatus is provided with a function of interrupting the recording and reproducing operation of the data when detecting a vibration and an impact or detecting a large position shift. Therefore, under existence of the vibration and the impact, a throughput of the magnetic disc apparatus is deteriorated. In the case that the applied vibration and impact are great, the date break is caused. Accordingly, the head position shift applied to the vibration and the impact from the external portion is a great obstruction in view of realizing a high throughput and a high reliability of the disc apparatus. In particular, in a product which is used under a state that the vibration and the impact always exist, such as a mobile information terminal, a on-vehicle information device or the like, there has been a problem that a sufficient performance can not be obtained.

OBJECT AND SUMMARY OF THE INVENTION

An object of the present invention is to provide a disc apparatus provided with an actuator in which a position shift of a head is not generated even under a vibration and an impact applied from an external portion, and a mobile information device having a high throughput and a high reliability given by the magnetic disc apparatus.

In order to achieve the object mentioned above, the present invention is characterized in that a head positioning mechanism for moving a head to a target radial position on a disc is constituted by a coarse actuator and a fine actuator, the coarse actuator is used at a time of moving between the tracks so as to perform a positioning operation, and the fine actuator is used with keeping a position of a movable portion of the coarse actuator without performing a feedback servo control at a time of following the track so as to perform a positioning operation.

In accordance with a first aspect of the present invention, there is provided a magnetic disc apparatus comprising:
 a recording medium in which a track constituted by a set of data is formed on a recording surface;
 a recording and reproducing element recording and reproducing the data on the track;
 a head supporting mechanism supporting a head provided with the recording and reproducing element; and
 an actuator constituted by a movable portion connected to the head supporting mechanism and a stationary portion fixed to a casing,
 wherein the magnetic disc apparatus is provided with a holding mechanism for holding the movable portion of the actuator driving the head supporting mechanism at a fixed position while an input command value is constant.

In accordance with a second aspect of the present invention, there is provided a magnetic disc apparatus as recited in the first aspect, wherein the holding mechanism brings a member fixed to the casing side into contact with the movable portion so as to keep a position of the actuator at an optional position.

In accordance with a third aspect of the present invention, there is provided a magnetic disc apparatus as recited in the first aspect, wherein the holding mechanism has two the actuators and is structured such that the respective actuators apply a drive force in a direction of keeping the head supporting mechanism at a fixed position.

In accordance with a forth aspect of the present invention, there is provided a magnetic disc apparatus as recited in the third aspect, wherein the actuator has a plurality of teeth and grooves in a stationary element side and is provided with a coil having teeth and grooves in such a manner as to oppose to the stationary element and applying an electric current.

In accordance with a fifth aspect of the present invention, there is provided a magnetic disc apparatus as recited in the first aspect, wherein the actuator is a coarse moving actuator largely moving the head supporting mechanism at a high speed, and a fine moving actuator finely moving the head so as to position is provided in the head supporting mechanism.

In accordance with a sixth aspect of the present invention, there is provided a magnetic disc apparatus as recited in the second aspect, wherein the actuator is a coarse moving actuator largely moving the head supporting mechanism at a high speed, and a fine moving actuator finely moving the head so as to position is provided in the head supporting mechanism.

In accordance with a seventh aspect of the present invention, there is provided a mobile information device provided with a magnetic disc apparatus comprising:
 a recording medium in which a track constituted by a set of data is formed on a recording surface;
 a recording and reproducing element recording and reproducing the data on the track;
 a head supporting mechanism supporting a head provided with the recording and reproducing element; and an actuator constituted by a movable portion connected to the head supporting mechanism and a stationary portion fixed to a casing, wherein the movable portion of the actuator driving the head supporting mechanism is held at a fixed position while an input command value is constant.

In accordance with an eighth aspect of the present invention, there is provided a magnetic disc apparatus comprising:

a magnetic disc provided with a recording surface for recording data;

a magnetic head moving on the recording surface so as to record and reproduce the data;

a magnetic head supporting mechanism supporting the magnetic head; and a coarse moving actuator connected to the magnetic head supporting mechanism and positioning the magnetic head to a predetermined position, wherein the actuator is provided with two drive portions for driving the magnetic head supporting mechanism in a rotational direction and a reverse-rotational direction of the magnetic disc, the drive portion is constituted by a stationary element fixed to a casing of the disc apparatus and provided with a plurality of teeth and a movable element provided in a magnetic head supporting mechanism side and having a plurality of teeth so as to oppose to the teeth of the stationary element, and the magnetic head supporting mechanism is moved and held at a fixed position by applying a predetermined voltage to the movable element.

BRIEF DESCRIPTION OF THE DRAWINGS

FIGS. 10A, 10B, 10C and 10D are schematic views explaining a position keeping capacity of the actuator in the second embodiment, in which FIG. 10A is a schematic view explaining an operation thereof, FIG. 10B is a graph showing a relation between a position and a force applied to a movable element, FIG. 10C is a graph showing a relation between a force applied to the actuator and the position, and FIG. 10D is a graph showing a relation between a potential energy and the position;

DESCRIPTION OF THE EMBODIMENTS

Figure 1:
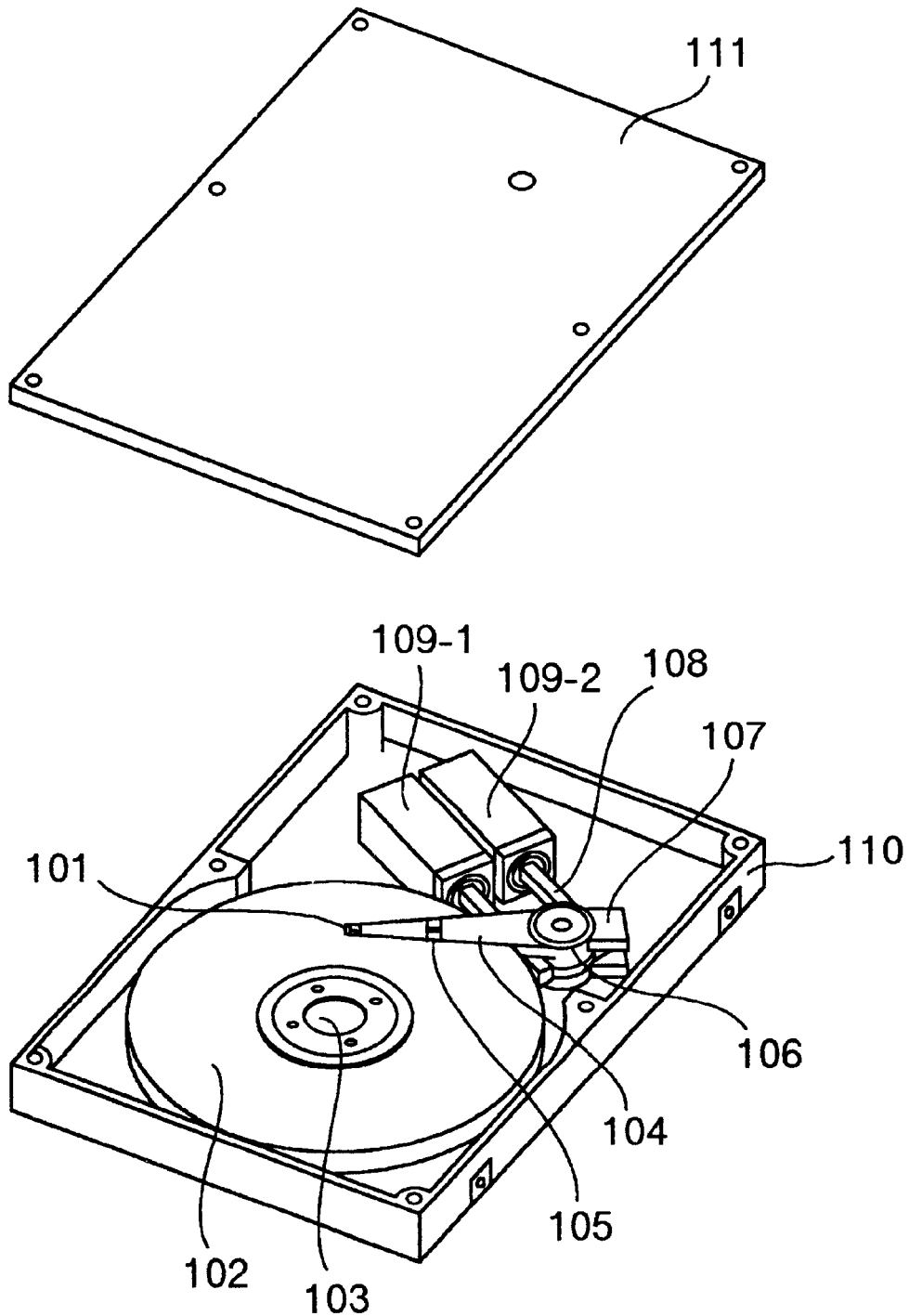
FIG. 1 is a schematic view showing an outer appearance of a disc apparatus in accordance with a first embodiment.

A description will be given below of an embodiment in accordance with the present invention with reference to the accompanying drawings. FIG. 1 shows a disc apparatus in accordance with a first embodiment of the present invention. In this view, a casing cover is removed and an inside structure can be seen.

As shown in FIG. 1, the disc apparatus is structured such that one or a plurality of discs 102 as a recording medium are mounted to a spindle motor 103 within a casing 110. A recording medium for performing a recording operation on the disc 102 and a head 101 having a reproducing element for performing a reproducing operation are mounted to a front end portion of a head supporting mechanism 104. The head supporting mechanism 104 has a center of gravity at a position of a pivot 106 by providing with a balancer 107. The head 101 is moved to a target radial position on the disc 102 at a high speed by rotating the head supporting mechanism 104 by means of coarse moving actuators 109-1 and 109-2. The coarse moving actuators 109-1 and 109-2 are fixed to the casing 110 at outer housings thereof. Further, a fine positioning actuator 105 having a small moving amount in comparison with the coarse moving actuator is provided in the head supporting mechanism 104 in accordance with the present embodiment for the purpose of finely positioning to the track. An upper cover (a casing cover) 111 is fixed to a casing 110 receiving the elements mentioned above by means of bolts.

A magnetic layer corresponding to a recording medium is formed on a surface of the disc 102, and a servo area on which a servo signal for previously detecting a head position is recorded and a data area for recording the data are arranged on the recording medium. The disc apparatus performs a positioning control by using a head position signal obtained by reproducing the servo area so that the head follows the target track.

In the embodiment shown in FIG. 1, a drive force of the coarse actuator of the head supporting mechanism 104 is generated in two actuators 109-1 and 109-2 which can move in a linear direction.

Figure 2A:
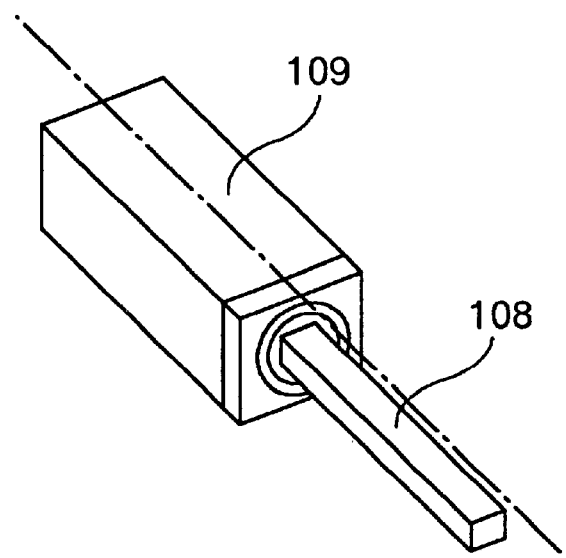
FIG. 2A is a schematic view showing an outer appearance of an actuator used in the first embodiment.
Figure 2B:
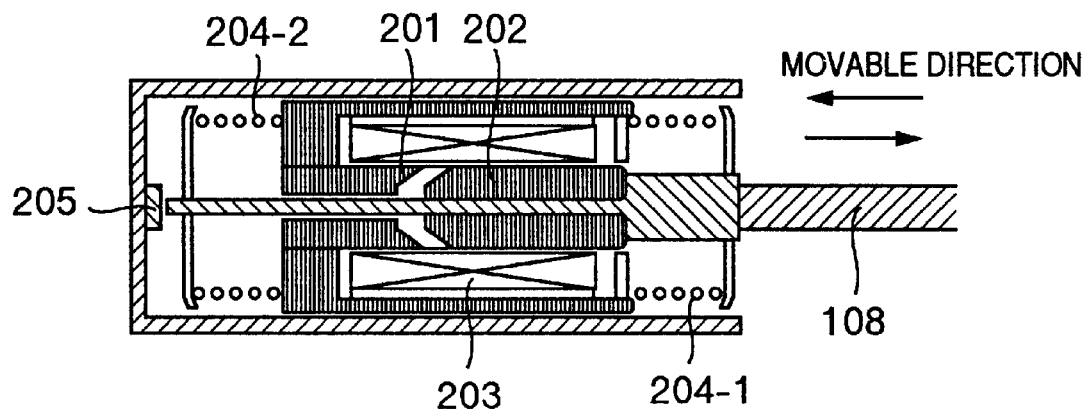
FIG. 2B is a cross sectional view of FIG. 2A.

FIG. 2 shows a structure of the actuator 109. This actuator is a kind of direct electric current solenoid and generates a magnetic suction force between a stationary core 201 made of a soft magnetic material and a movable core 202 by flowing a direct electric current to a coil 203 wound around the stationary core 201 and the movable core 202. The movable core 202 is mounted to a drive force transmitting member 108. The movable portion is supported by two springs 204-1 and 204-2, and previously applies a force to the movable portion in a direction that the movable core 202 moves apart from the stationary core 201. In the present embodiment, these two drive force transmitting member are inserted to a rotary member (a pivot 106: which is inserted to a pivot shaft 106' and rotates around this axis) fixing the magnetic head supporting mechanism 104 at substantially symmetrical positions in accordance with a welding operation or the like.

Figure 3A:
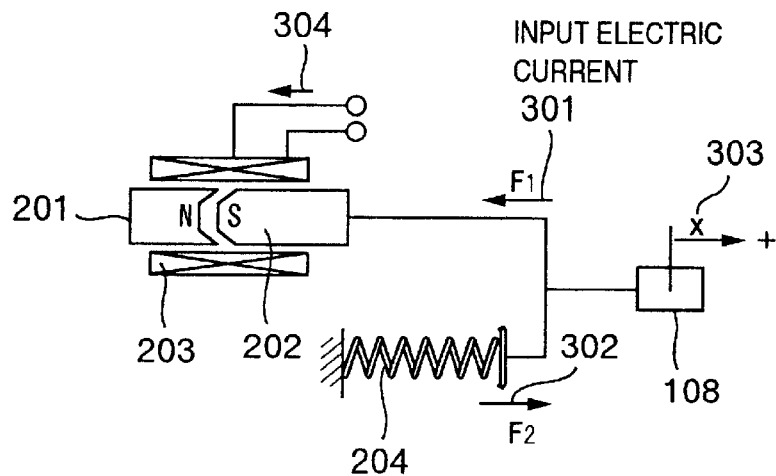
FIG. 3A is a schematic view of the actuator used in the first embodiment.

FIG. 3 shows an operation principle of the actuator in accordance with the present embodiment. FIG. 3A schematically shows a state that these forces are applied. A force 302 is applied to an actuator movable portion connected to the drive force transmitting member 108 by a spring 204 in a direction that the movable core 202 moves apart from the stationary core 201. On the contrary, a magnetic suction force 301 is applied to the movable core 202 by energizing the coil 203.

Figure 3B:
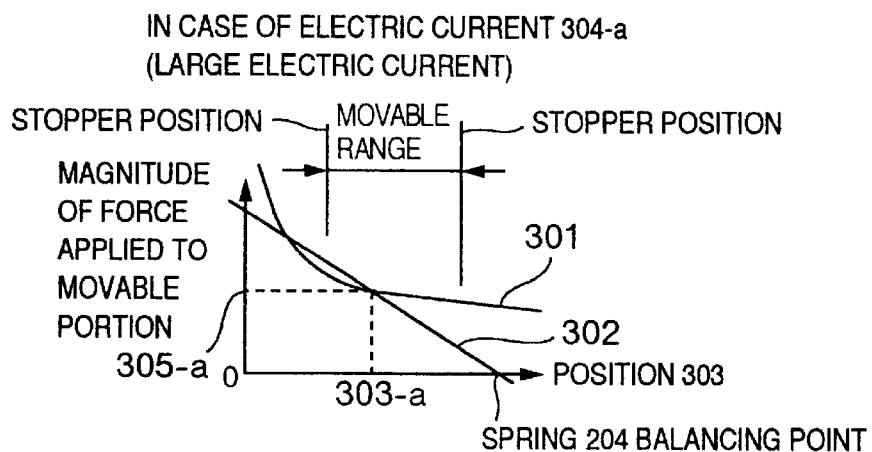
FIG. 3B is a graph showing a relation between a drive force and a position in the case that an applied electric current is large.
Figure 3C:
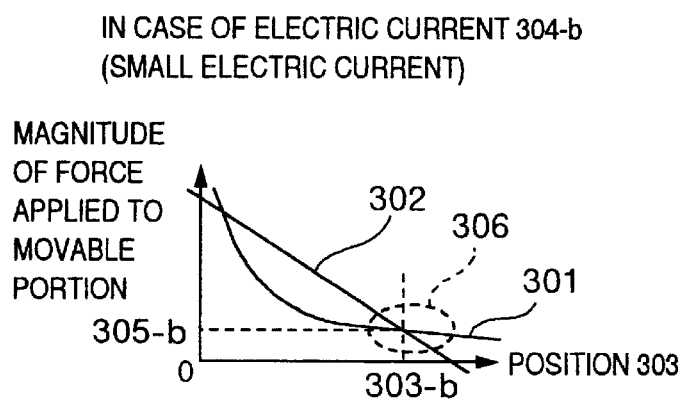
FIG. 3C is a graph showing a relation between a drive force and a position in the case that an applied electric current is small.

FIGS. 3B and 3C show a state of the position of the movable portion and a change of force. A description will be given of how two forces 301 and 302 are changed by a position 303 of the movable portion. In this case, the position 303 of the movable portion is set so that a right direction of a paper surface is a normal direction. FIG. 3B shows a case that a current value 304 applied to the coil 203 is large (304-*a*), and FIG. 3C shows a case that the current value is small (304-*b*). A profile with respect to the position 303 of the magnetic suction force 301 can be variously set on the basis of a front end shape of the movable core and the stationary core. However, since generally the suction force is exponentially reduced with respect to a distance against the stationary core, the profile shown by a curve 301 is obtained. On the contrary, since the spring force 302 is in proportion to a displacement from an equilibrium point, the spring force 302 is changed in a manner shown by a straight line 302.

At a time of the current value 304-*a* (at a time of flowing a large electric current), two forces 301 and 302 are balanced since a force 305-*a* having a fixed magnitude is always applied in a negative direction at a position 303-*a* of each of them. At a time of changing the current value to a value 304-*b* (at a time of flowing a small electric current), since the magnetic suction force 301 is made small in comparison with the time of the value 304-*a*, the balance position 303-*b* becomes a position shifted in a positive direction in comparison with the value 303-*a*. That is, the actuator in accordance with the present embodiment can change the balance position of the movable portion by changing the current value corresponding to a command value.

In accordance with a feature of the actuator of the present embodiment, in the case that an input value is constant due to an application of the force mentioned above, a restoring force for returning the balance position in correspondence to an amount of shift is applied. FIG. 4 shows a relation between the position of the movable portion and the applied force.

Figure 4A:
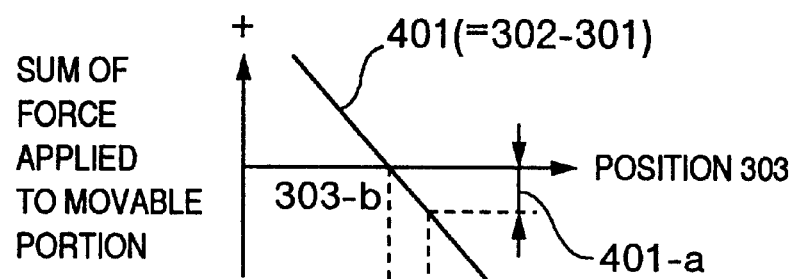
FIG. 4A is a diagram showing a position of the actuator and a holding capacity.

FIG. 4A is a schematic view showing a state that a force 401 obtained by combining two forces 301 and 302 mentioned above is changed in correspondence to the position 303 of the movable portion within an area near the balance point 303-*b* in the case of keeping in the current value 304-*b* (small electric current), within an area 306 in FIG. 3C. As shown in FIG. 3C, two forces 301 and 302 are reversed at the balance position 305-*b* in view of a magnitude. Accordingly, the combined force 401 becomes a force applied in a negative direction in a positive side from the value 303-*b* and in a positive direction in a negative side from the value 303-*b*.

Figure 4B:
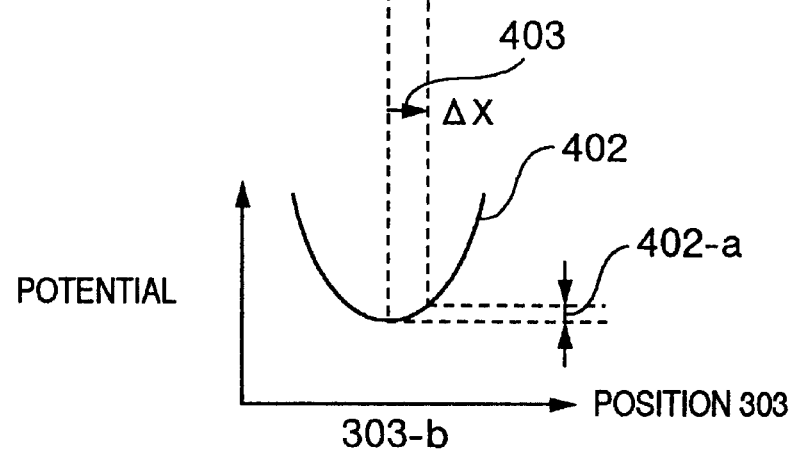
FIG. 4B is a diagram showing a relation between the position of the actuator and a potential energy.

Since the force 301 applied to the movable portion is a magnetostatic force with respect to the movable core 202 and the force 302 is an elastic force of the spring 204, the combined force 401 shown in FIG. 4A corresponds to a force given by an incline of a potential energy expressed by sum of a magnetostatic energy and a spring elastic energy. A profile of the potential energy is shown in FIG. 4B. The potential energy 402 becomes minimum at the balance point 303-*b* and it can be understood from the drawing that this point is most stable.

On the basis of the description mentioned above, it is understood that a negative feedback is applied to the actuator in accordance with the present invention due to a shift from the balance position of the actuator itself while the fixed current value is input and the actuator keeps the position of the movable portion at the balance position at which the potential energy becomes minimum. As mentioned above, in accordance with the present embodiment, when two drive force generating mechanisms are provided and a current value in correspondence to the moving amount is applied so as to move the magnetic head to a predetermined position, the actuator moves to the position in correspondence to the electric current and keeps the position as long as the current value is kept.

On the contrary, in the case of the voice coil motor corresponding to the actuator used in the conventional magnetic disc apparatus, a magnitude and a direction of the force applied in correspondence to the position of the movable portion are not changed while the fixed current value is input. Accordingly, in order to position on a predetermined track, there is constructed a feedback loop detecting a head positioning signal from a servo area intermittently arranged on the disc 102 by the head 101 and changing the current value input to the actuator by the positioning control circuit one by one.

In the case of using the actuator in accordance with the present embodiment, since the actuator itself always keeps the position thereof, a feedback control for positioning on the track is not required.

The balance position 303-*b* described above is changed in correspondence to the magnitude of the electric current flowing through the coil 203 as described in FIGS. 3B and 3C. Since the balance position is definitely determined with respect to a certain current value, it is possible to position the movable portion at an optional position by determining the magnitude of the current value.

In the disc apparatus in accordance with the present embodiment, two actuators 109 are arranged as shown in FIG. 1. Two actuators 109-*a* and 109-2 are structured such that one movable portion is connected to another movable portion via the pivot 106 by passing through the drive force transmitting members 108. In the disc apparatus, a movable angle of the head supporting mechanism 104 is limited to a range between 30 and 40 degrees. Accordingly, a stroke of the actuator 109 is sufficiently set to be about some mm at the maximum. The force is transmitted to the pivot from the drive force transmitting member only by fixing and connecting a metal band fixed to a front end side of the drive force transmitting member 108 to the pivot 106 by means of a spot welding, a screw of the like without using a frictional force such as a gear, a roller or the like. Further, the drive force transmitting member 106 may be directly fixed to the pivot 106 in accordance with the method mentioned above. In accordance with the structure mentioned above, since two actuators 109-1 and 109-2 are operated in reverse directions with each other (perform a push-pull operation), a couple of forces around the pivot 106 is generated and generates a drive force for the head supporting mechanism 104.

In this case, the direct-motion type actuator is generally structured such that the movable portion easily moves with respect to a parallel acceleration in a movable direction generally input from an external portion. However, in accordance with the present embodiment as mentioned above, since the head supporting mechanism is driven in accordance with a push-pull operation as well as the actuator has a nature keeping the position, a relative position of the head supporting mechanism 104 with respect to the disc 102 is not changed. This is because an angle of the head supporting mechanism 104 with respect to the casing is changed only when two actuators 109-1 and 109-2 move in a reverse direction with respect to each other.

The disc apparatus in accordance with the present embodiment is provided with the finely moving actuator 105 constituted by a piezoelectric element in the head supporting mechanism 104 in addition to the coarse moving actuator mentioned above. As already mentioned, the coarse moving actuator in accordance with the present embodiment can keep the constant position as long as the input current value is keep constant. Accordingly, with respect to the coarse motion, it is not particularly required to control with employing a feedback loop. Further, even in the case of using the fine moving actuator, a control system can construct the control loop only by the fine moving actuator, so that there can be obtained an advantage that the positioning system using the fine moving actuator can be constructed by a simple control system.

As mentioned above, in accordance with the structure of the present embodiment, there can be obtained an advantage that the head does not generated a position shift from the track even in the case that an impact is applied from an external portion. Further, there can be obtained an advantage that a track following operation can be performed by using the fine actuator without constructing a complex control system.

Figure 5:
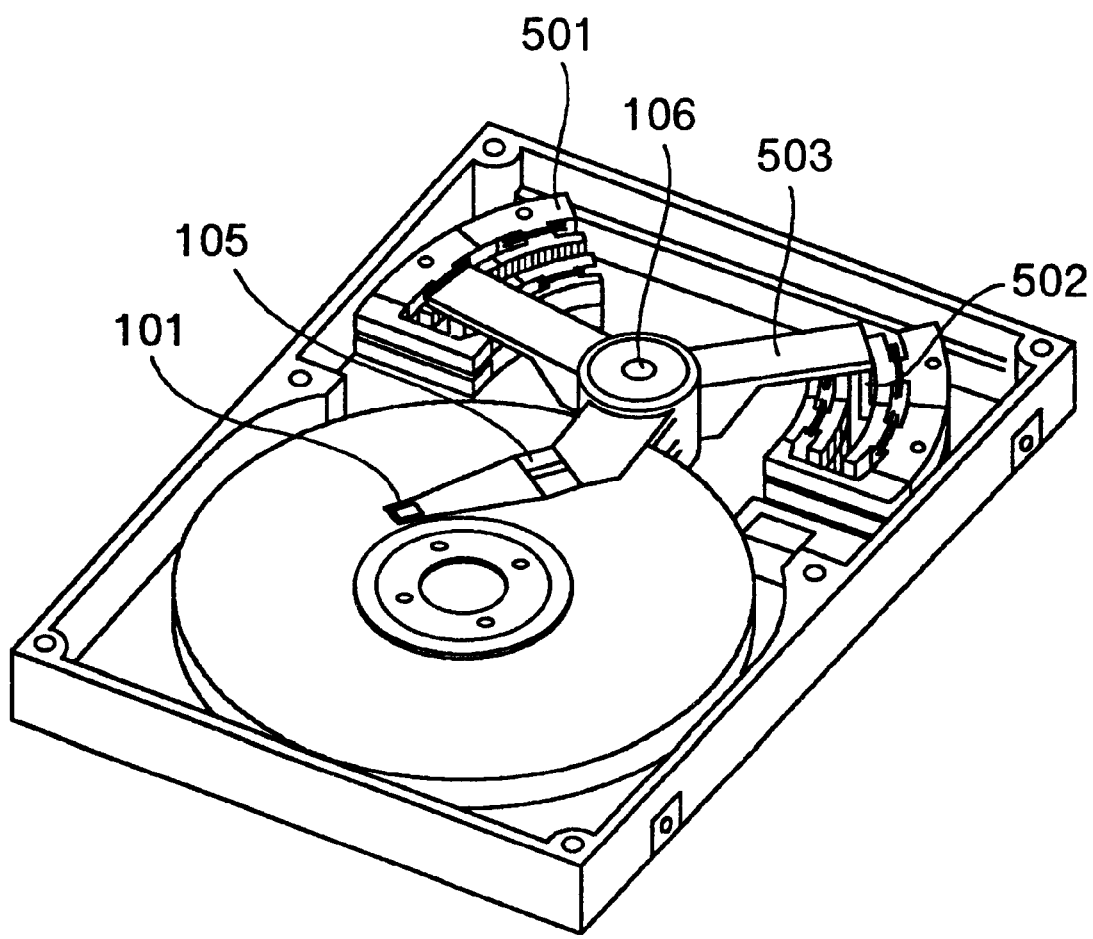
FIG. 5 is a schematic view showing an outer appearance of a disc apparatus in accordance with a second embodiment.

Next, a description will be given of a second embodiment in accordance with the present invention with reference to FIGS. 5 to 10. FIG. 5 is a schematic view showing a structure of an interior portion by opening a casing cover of a disc apparatus in accordance with the present embodiment.

In the disc apparatus shown in FIG. 5, an actuator coarsely moving the head supporting mechanism 104 is constituted by a stationary element 501 formed by an electric magnet fixed to the casing 110, a movable element 502 formed by a soft magnetic body capable of moving between the stationary elements 501 and an arm-like member 503 transmitting a motion of the movable element 502 to the head supporting mechanism 104. That is, the drive force transmitting member 503 is provided in the member (the pivot 106) mounting the head supporting mechanism 104 at a predetermined angle around the pivot shaft 106', the movable elements 502 are respectively provided at front end portions thereof and the stationary elements 501 are respectively provided in such a manner as to hold the movable element 502 therebetween.

Figure 6:
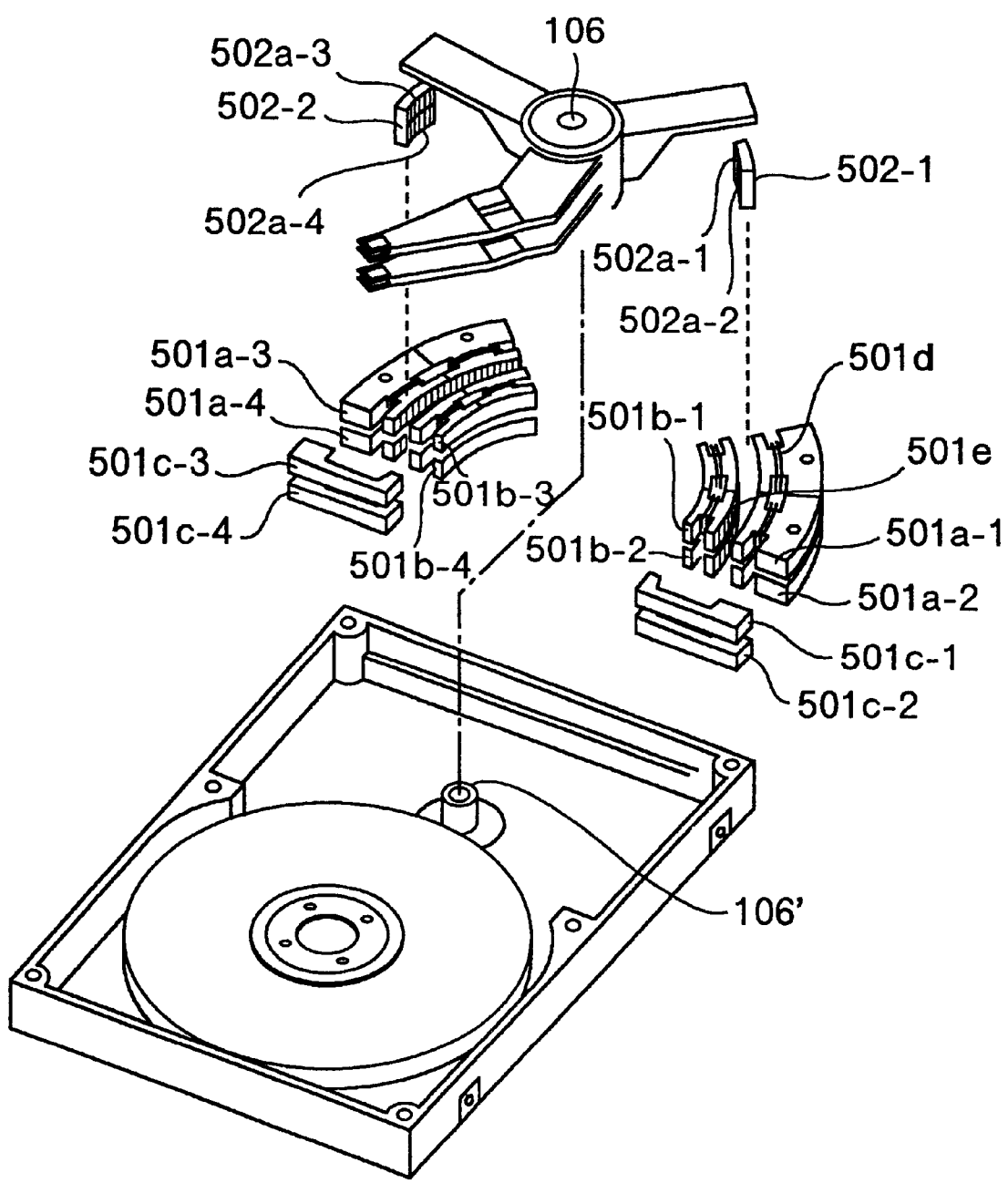
FIG. 6 is an exploded schematic view of an actuator portion used in the second embodiment.

FIG. 6 shows constituting elements of the actuator. The stationary element 501 fixed to the casing 110 has an outer portion 501*a* of the movable element 502 rotating on a circumference around the pivot shaft 106' and an inner portion 501*b*. An electric wire 501*d* for generating a magnetic flux toward the inner stationary element via the movable element 502 is wound around the outer stationary element 501*a*. The outer stationary element 501*a* and the inner stationary element 501*b* are magnetically connected in a yoke 501*c* so as to form a pair of stationary elements. The pair of stationary elements are vertically separated into both sides of the pivot 106, whereby four sets of stationary elements are arranged totally. Teeth 501*e* at a fixed period are provided on a surface of the four stationary elements 501 opposing to the movable element 502, and in the same manner, teeth 502*a* are formed on the surface of the movable element 502 opposing to the stationary element 501 at the same period as that of the teeth 501*e*.

These are arranged in four sets of stationary elements in the manner mentioned below so that the relative positional relations of the teeth are respectively different. That is, the present embodiment is structured such that a principle of a linear pulse motor is employed in a drive source. In this case, in the present embodiment, in order to move the head supporting mechanism at a high speed, the structure is made such that the drive sources are arranged in right and left sides with respect to the pivot shaft, however, it is a matter of course that the drive source may be provided only in one side.

Figure 7A:
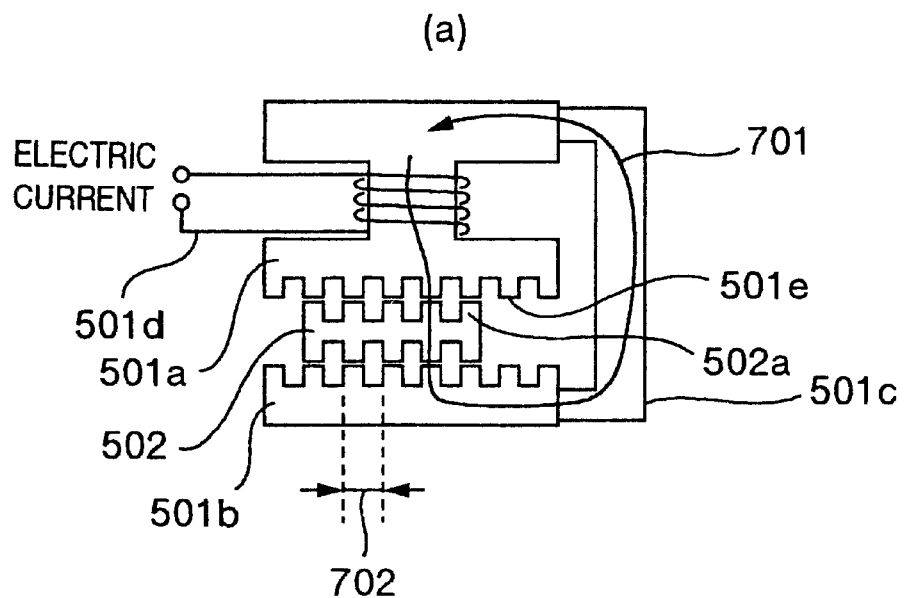
FIG. 7A is a schematic view of the actuator used in the second embodiment.

A description will be given of a way how the actuator generates the drive force with reference to FIG. 7. FIG. 7A schematically shows a positional relation between a set of stationary element and movable element. A period of the teeth 501*e* of the stationary element and a period of the teeth 502*a* of the movable element are commonly set to an equal period 702. A magnetic flux is generated within the stationary element 501*a* by flowing an electric current through the electric wire 501*d*, whereby a magnetic circuit 701 circulating around the movable element 502 and the stationary elements 501*b* and 501*c* is formed. At a position of the movable element 502 where the teeth are engaged with each other as shown in FIG. 7A, a reactance between the elements 501*a*, 502 and 501*b* becomes minimum and a most stable position is achieved.

Figure 7B:
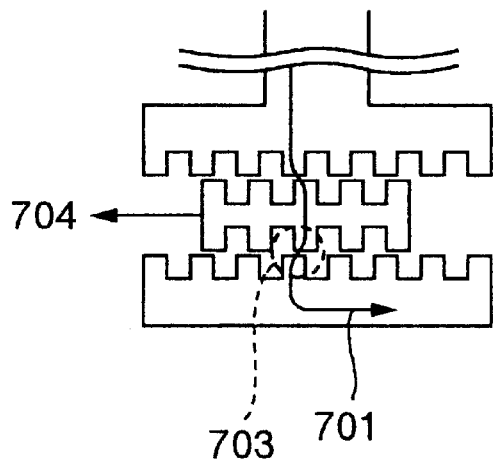
FIGS. 7B and 7C are diagrams showing a moving direction of the actuator used in the second embodiment and a force applied direction.
Figure 7C:
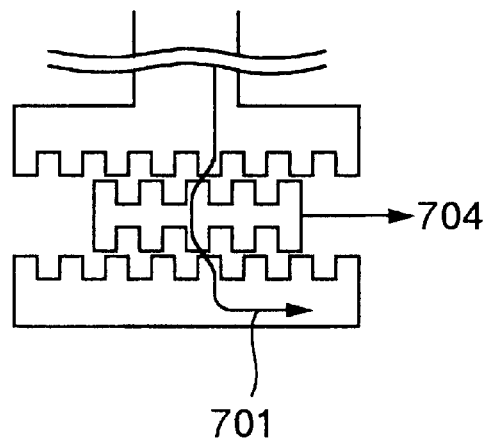

On the contrary, at a position where only one fourths is shifted with respect to the period 702 of the tooth groove from the state in FIG. 7A as shown in FIG. 7B, since the magnetic flux is bent at a gap portion 703 of the stationary element and the movable element, the reactance is increased and an energy becomes in a high state. At this time, since the magnetic flux is going to become straight due to its own tensile force, a force 704 in a leftward direction of the paper surface is applied to the movable element 502. In the same manner, at a position where only one fourths of the period 702 is shifted in an opposite direction to FIG. 7B as shown in FIG. 7C, a force in a rightward direction of the paper surface is applied. The actuator in accordance with the present embodiment sets the force generated in the movable element 502 to the drive force of the head supporting mechanism by utilizing the tensile force of the magnetic flux.

Figure 8A:
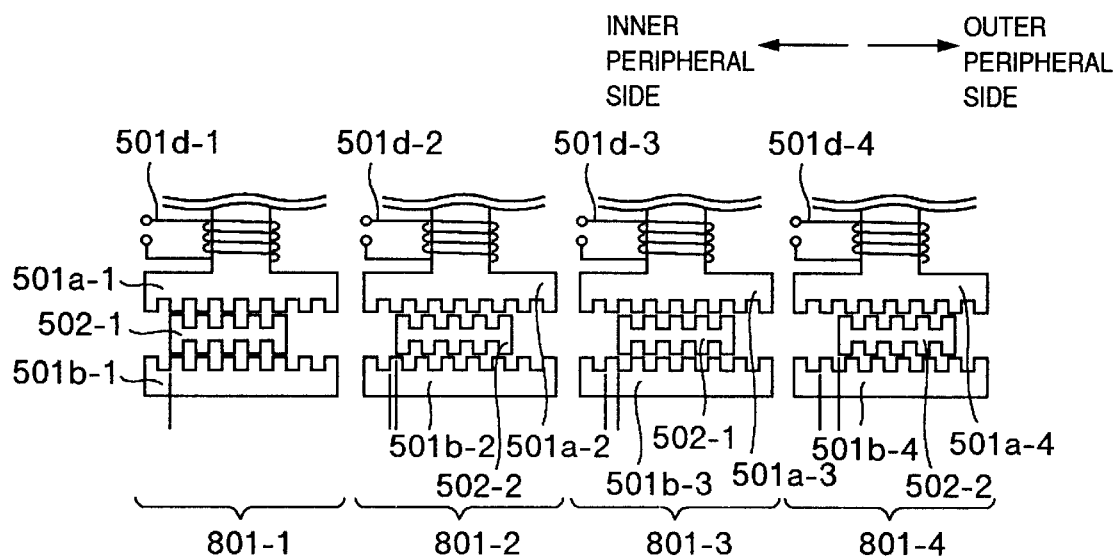
FIG. 8A is a schematic view of an operating state of the actuator used in the second embodiment.

A description will be given of a sequence for rotating the head supporting mechanism by using the force applied to the movable element 502 from four sets of stationary elements 501 with reference to FIG. 8. FIG. 8A is a schematic view what positional relation four sets of stationary elements and the movable elements form at a time when the head supporting mechanism stops at a certain angle. Four sets of stationary elements and movable elements are set to 801-1 to 801-4. Further, as a matter of convenience, a direction in which the head supporting mechanism moves in an outer peripheral side in each of the stationary elements is set to a rightward direction of the paper surface. As shown in FIG. 8A, four sets of stationary elements are arranged in such a manner as to be shifted at one fourths of the period 702 with respect to the movable element, that is, in such a manner as to be shifted at phase 90 degrees.

Figure 8B:
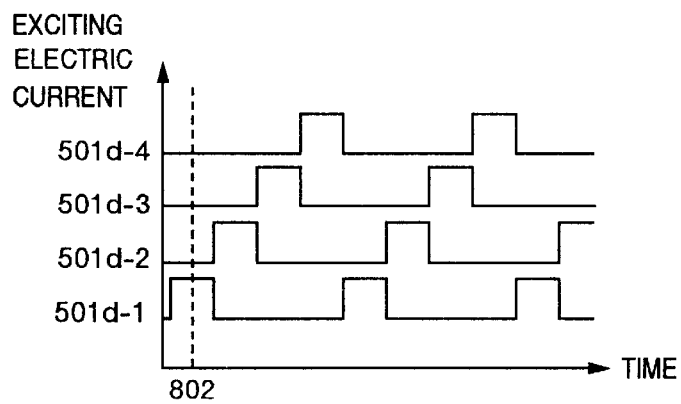
FIG. 8B is a chart showing an application timing of an exciting electric current for moving to a position shown in FIG. 8A.

FIG. 8B shows an example of a simplest sequence for rotating the movable element 502 in the arrangement mentioned above. FIG. 8B shows a change of the electric current applied to the electric wire 501*d* of each of the stationary elements with the passage of time and FIG. 8C shows a change of position with respect to one of the movable elements 502 in correspondence to FIG. 8B.

In the example shown in FIG. 8B, an electric current is applied to the stationary elements (the stationary elements are excited) one by one in the order that the phase is shifted at 90 degrees (the order of 501*d*- and 501*d*-4). For example, the movable element 502 moves only at one fourths of the period 702 to the inner peripheral side (FIG. 8C) so as to be the most stable position where the teeth are opposed to each other by switching the state from the state exciting to the set 801-1 to state exciting to the set 801-2, and the position of the movable element 502 is kept. The position of the movable element 502 is moved to the inner peripheral side in accordance with one fourths step at each period 702, as shown in FIG. 8C, by subsequently repeating the same procedure.

Figure 8C:
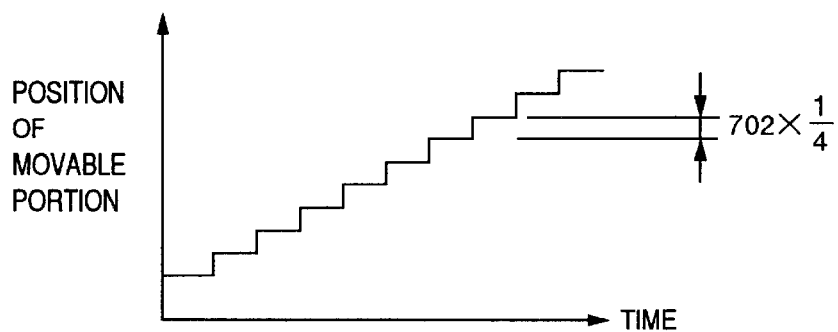
FIG. 8C is a graph showing a change with the passage of time of the position shown in FIG. 8A.

In the example shown in FIGS. 8B and 8C, the position at which the movable element 502 stops is limited to an apart position at an interval of one fourths of the period 702, however, it is possible to stop the movable portion 502 at an optional position by setting a moving sequence to a different one.

Figure 9A:
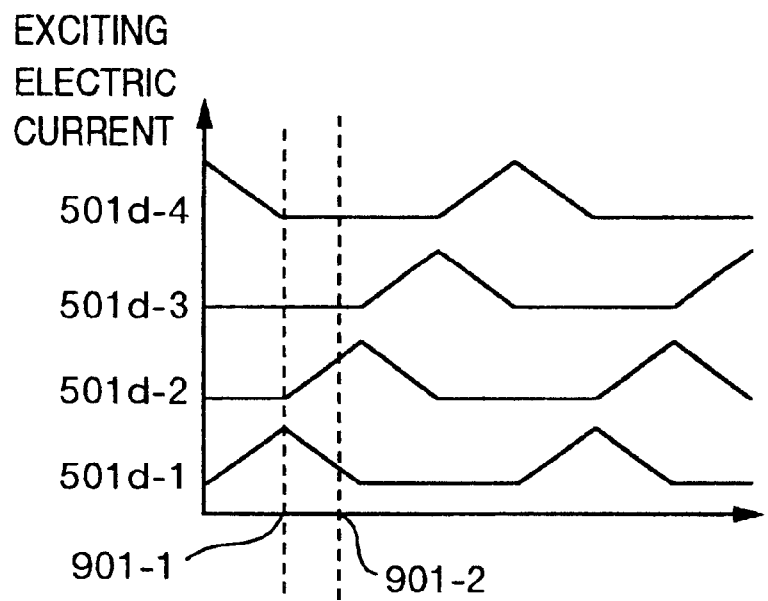
FIG. 9A is a chart showing an exciting electric current and an application timing thereof for explaining an example of another operating procedure of the actuator used in the second embodiment.

FIG. 9 shows a sequence for achieving a continuous movement. At a time 901-1, a positional relation shown in FIG. 8A is achieved. A different point from the sequence shown in FIG. 8B is that one set is always excited and switched in FIG. 8B and on the contrary, two sets are simultaneously excited while changing the electric current in FIG. 8A.

Figure 9B:
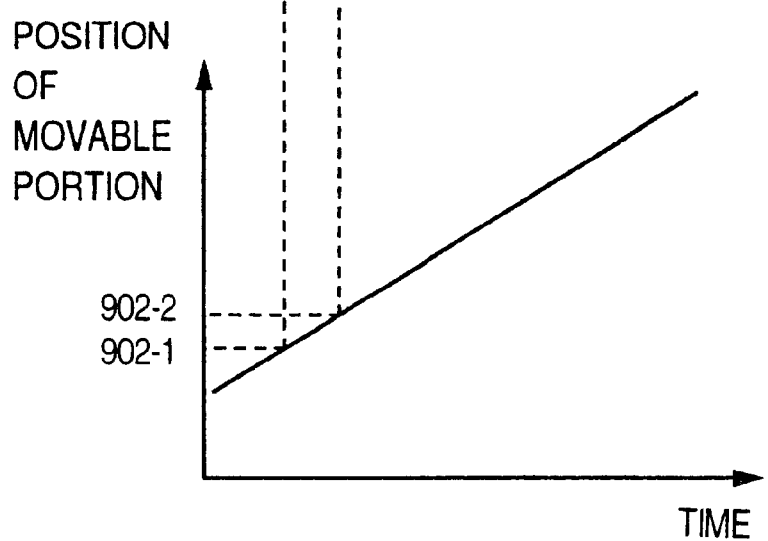
FIG. 9B is a schematic view showing a change with the passage of time of the position shown in FIG. 9A.

FIG. 9 shows a case that a rotating operation in an inner peripheral side is performed from the positional relation shown in FIG. 8A at the time 901-1. At the time 901-1, only the set 801-1 is excited (501*d*-1), however, when thereafter moving to the inner peripheral side, the electric current is also supplied to the set 801-2 where the phase is 90 degrees shifted little by little (501*d*-2), and the electric current of the set 801-1 is reduced as the electric current of the set 801-2 is increased and is continuously changed. The position of the movable element 502 is continuously changed as shown in FIG. 9B in accordance with the procedure mentioned above while keeping a balance between the force applied from the stationary element 501-1 and the force applied from the stationary element 501-2.

Figure 10A:
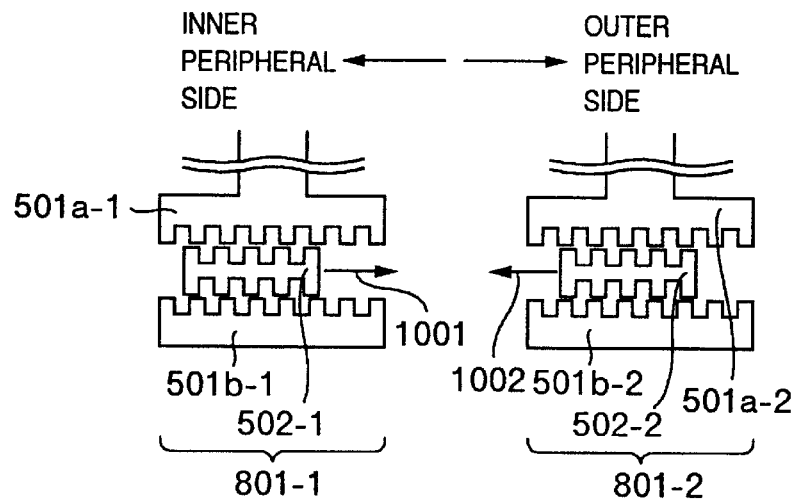
Figure 10B:
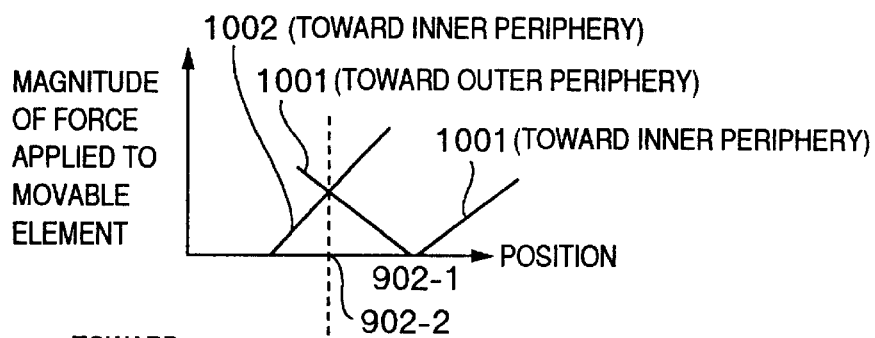

The force applied to the movable element 502 at a time of moving to the position 902-2 during the time between 901-1 and 901-2 is structured as shown in FIG. 10A such that a force 1001 toward an outer peripheral direction is applied to the set 801-1, a force 1002 toward an inner peripheral direction is applied to the set 801-2, and these forces are balanced with each other. When the movable element 502 is at a position 902-2, a magnitude of the force applied to the movable element 502 from the respective stationary element is expressed by FIG. 10B.

Figure 10C:
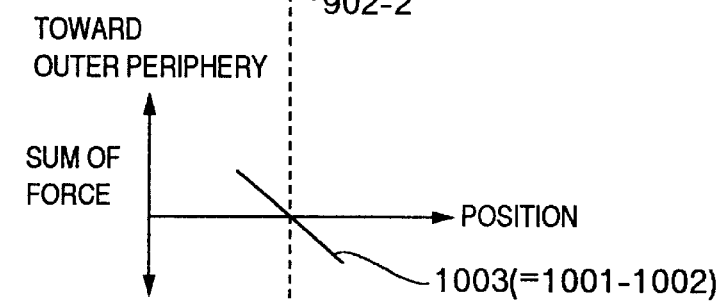
Figure 10D:
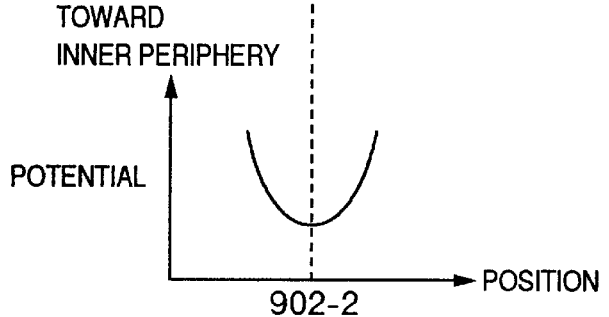

A change of a force obtained by combining the force 1001 toward the outer peripheral direction and the force 1002 toward the inner peripheral direction near a position 902-2 forms a profile as shown in FIG. 10C. Further, a profile of a potential energy of this force becomes the minimum at the position 902-2 as shown in FIG. 10D. Accordingly, in the same manner as the first embodiment, it is understood that a negative feedback is applied around the position 902-2. Therefore, it can be understood that also in the second embodiment, the actuator itself has a negative feedback function and a property of keeping the position of the movable portion at the balancing position where the potential energy becomes the minimum.

In this case, in accordance with the present embodiment, the structure is made such that two actuator 510 are provided and the drive force is transmitted by two drive force transmitting members 503. However, as far as the structure can be made such that the actuator generates and keeps a predetermined force at a time of holding the head supporting mechanism by setting one actuator, it is not necessary to provide two actuators.

Figure 11:
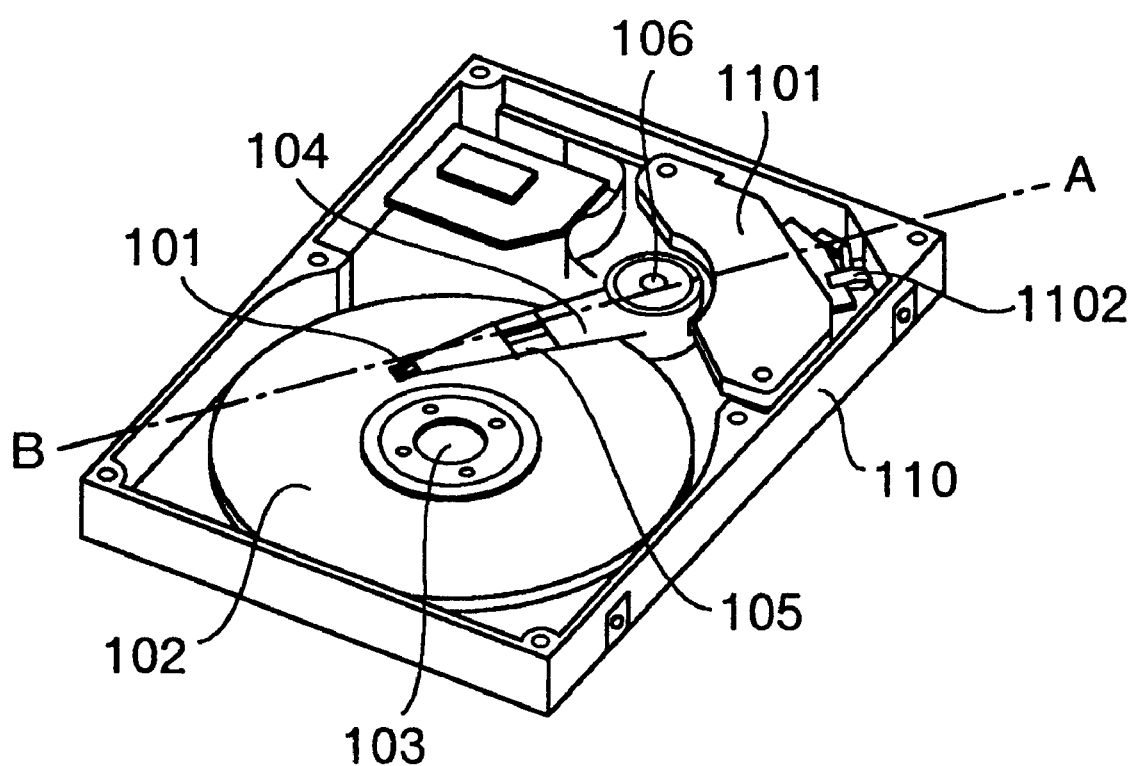
FIG. 11 is a schematic view showing a structure of a magnetic disc apparatus corresponding to a third embodiment.

Next, a description will be given of a magnetic disc apparatus in accordance with a third embodiment of the present invention with reference to FIGS. 11 to 14. A structure of a magnetic disc apparatus corresponding to a third embodiment is shown in FIG. 11. In the same manner as those shown in FIGS. 1 and 5, the structure is shown in a state of removing the casing cover. The head supporting mechanism 104 is has a center of gravity at a position of the pivot 106, and rotates around the pivot 106 due to the drive force generated by the voice coil motor 107 so as to move the head to a target radial position on the disc 102. A fixing mechanism 1102 for fixing a movable member 1101*b* connected to the head supporting mechanism is provided outside a voice coil motor 1101. An operation of the fixing mechanism 1102 will be described below. The fine moving actuator 105 for performing a fine positioning to the track is provided in the head supporting mechanism 104. The fine moving actuator 105 employs a piezoelectric element having a small moving amount and a high rigidity.

Figure 12A:
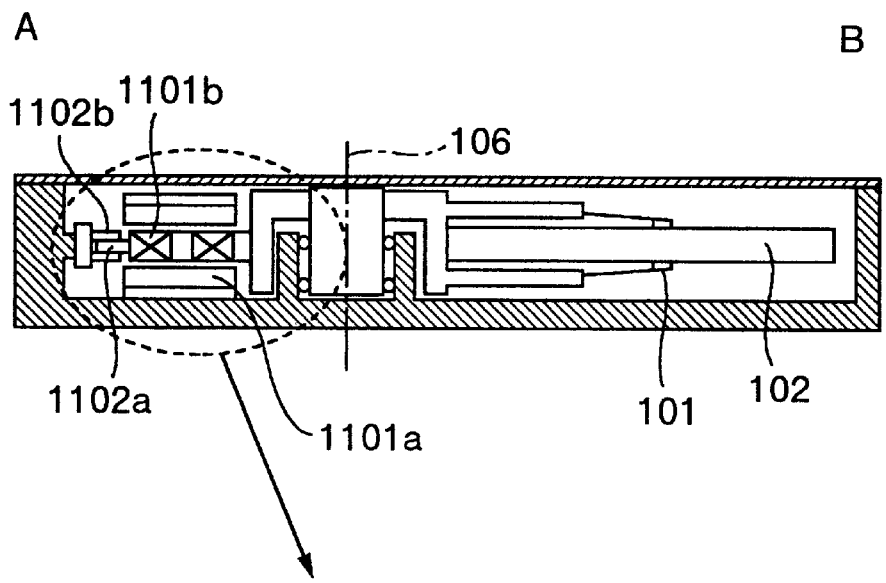
FIG. 12A is a cross sectional view of an inner portion of the magnetic disc apparatus used in the third embodiment.
Figure 12B:
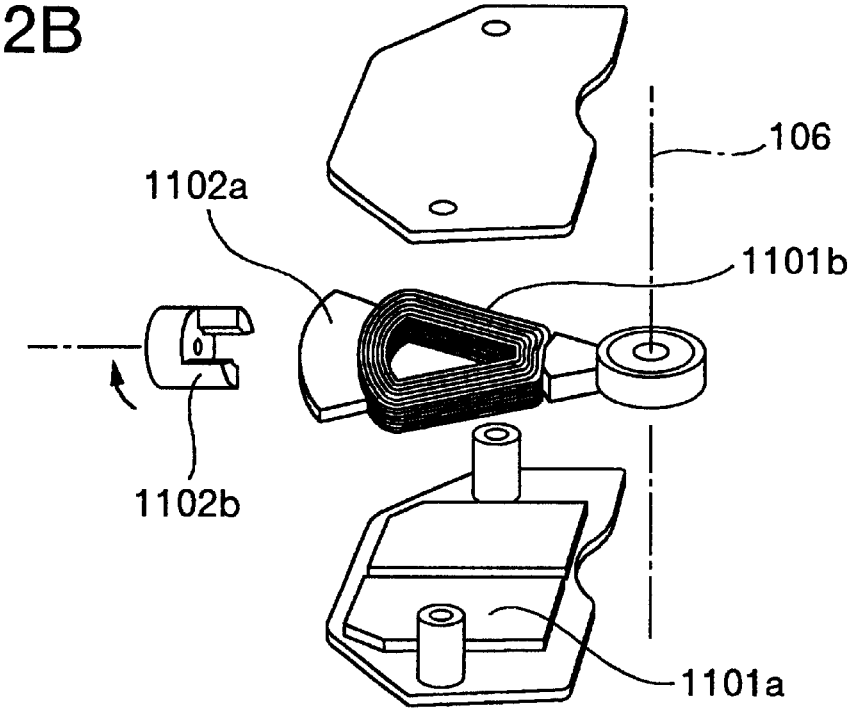
FIG. 12B is an exploded perspective view of a coarse actuator used in the third embodiment.

A description will be given of a structure of a head positioning mechanism in accordance with the present embodiment with reference to FIG. 12. FIG. 12A is a schematic view showing a cross section along a line A-B of the magnetic disc apparatus shown in FIG. 11. FIG. 12B is a schematic view showing a drive mechanism which is drawn in a left side of the pivot 106 in this FIG. 12A and picked up. The voice coil motor 1101 corresponding to the coarse moving actuator is constituted by a permanent magnet 1101a fixed to the casing and a coil 1101b connected to the head supporting mechanism 104 and capable of moving around the pivot 106. A coil outer edge member 1102a is provided in an outer side of the coil 1101b. The outer edge member 1102a is structured such as to fix a position of the movable portion 1101b in the voice coil motor by being pressed by a brake member 1102b.

Figure 13A:
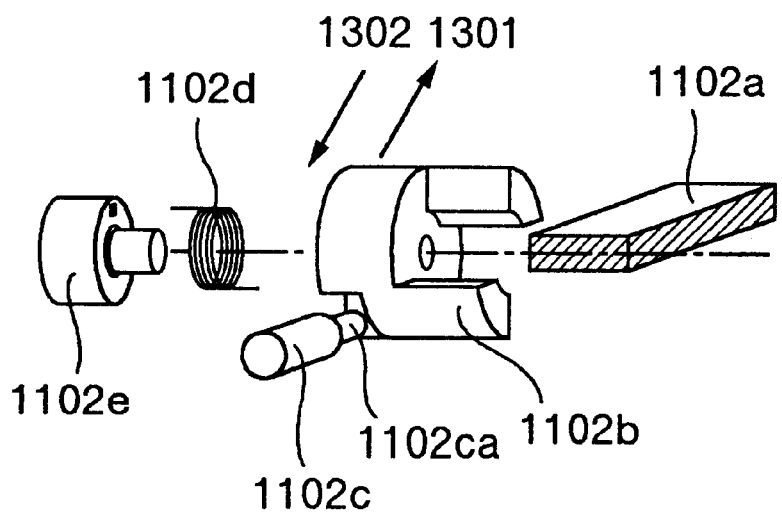
FIG. 13A is an exploded perspective view of a structure of a mechanism for positioning and fixing a coarse actuator.
Figure 13B:
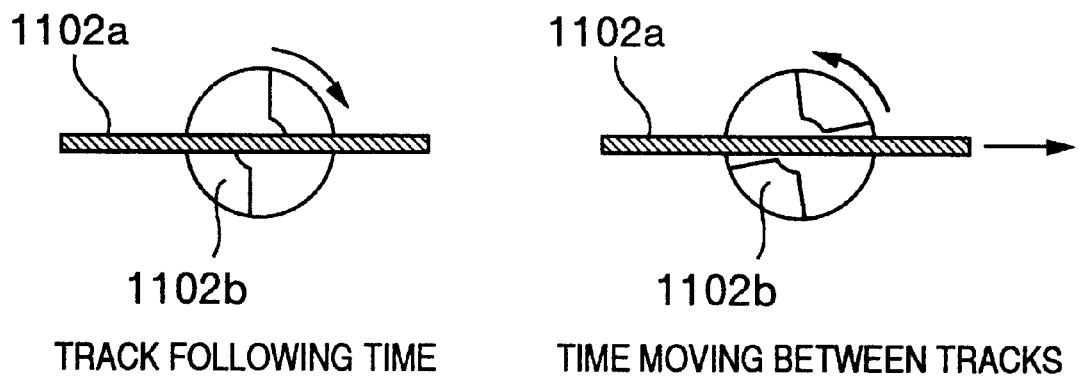
FIG. 13B is a schematic view explaining a principle of positioning and fixing the coarse actuator.

FIG. 13 shows a further detail structure of the mechanism 1102 for fixing the position. The brake member 1102b pressing the coil outer edge member 1102a is connected to the casing 110 via a solenoid 1102c, a spring 1102d and a bearing 1102e. The brake member 1102b can rotate by the bearing 1102e.

The spring 1102d always applies a force to the brake member 1102b in a direction 1301 pressing to the member 1102a and serves to restrict the position of the movable portion 1102b in the voice coil motor by being brought into contact with the member 1102a. At a time of moving the movable portion 107b in the voice coil motor, a plunger 1102ca is pressed out by energizing the solenoid 1102c for canceling the position fixing. The plunger 1102ca rotates the brake member 1102b in a direction 1302 moving apart the brake member 1102b from the member 1102a against the force generated by the spring 1102d so as to make the voice coil motor movable portion 1101b free. The movable portion is applied a drive force from the magnetic flux generated by the permanent magnet 1101a by energizing the movable portion coil 1101b during this time, and it is possible to move the head to the target radial position.

In the magnetic disc apparatus in accordance with the present embodiment, the outer edge member 1102a and the brake member 1102b are brought into contact with each other within the sealed container, however, since these elements are brought into contact with each other in a stationary state and does not slide with each other, there is no particular problem if dusts or the like are generated.

A description will be given of an operation of the positioning control system when the magnetic disc apparatus in accordance with the present embodiment makes the head follow to the track and when the magnetic disc apparatus moves the head between the tracks, with reference to FIG. 14.

Figure 14A:
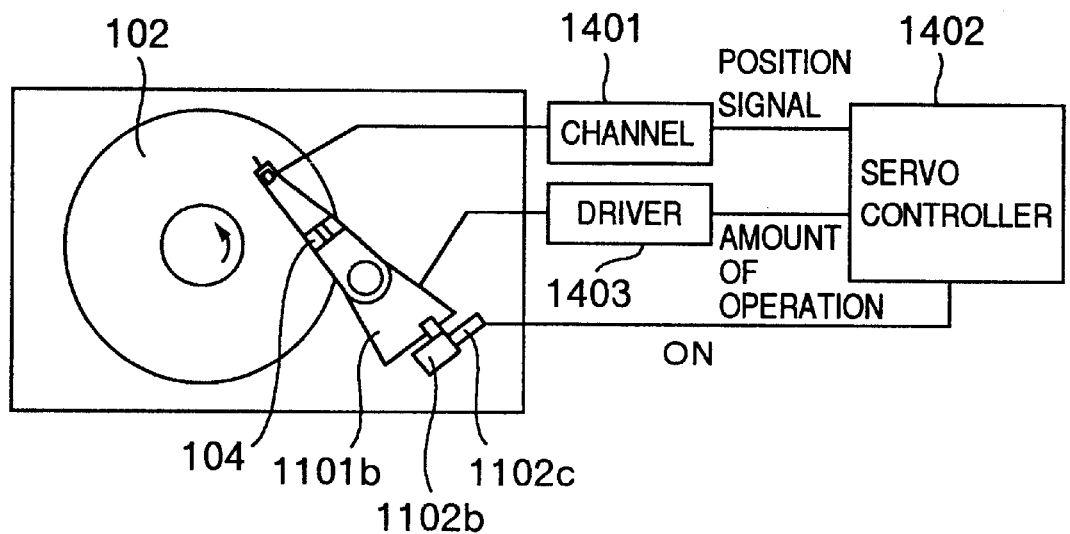
FIGS. 14A and 14B are block diagrams showing an operation of a positioning control system at a time of moving between the tracks and at a time of following the track.

FIG. 14A is a block diagram showing an operation at a time when the head moves between the tracks. A drive force of the voice coil motor 1101 corresponding to the coarse actuator is used for a large movement over the track. However, the movable portion 1101b of the voice coil motor is normally restricted by the position fixing mechanism 1102. In a state that an electric current supplied to the solenoid 1102b is turned on, the brake member 1102b shown in FIG. 13A is pressed away from the member 1102a and the voice coil motor can be freely moved, the movable portion coil 1101b is energized so as to move the head. The positioning control system at this time becomes the same construction as the conventional magnetic disc apparatus which is structured such that a servo controller 1402 determines an amount of operation of the voice coil motor on the basis of a position signal obtained by demodulating the servo signal which the head 101 reproduces, by a channel 1401.

Figure 14B:
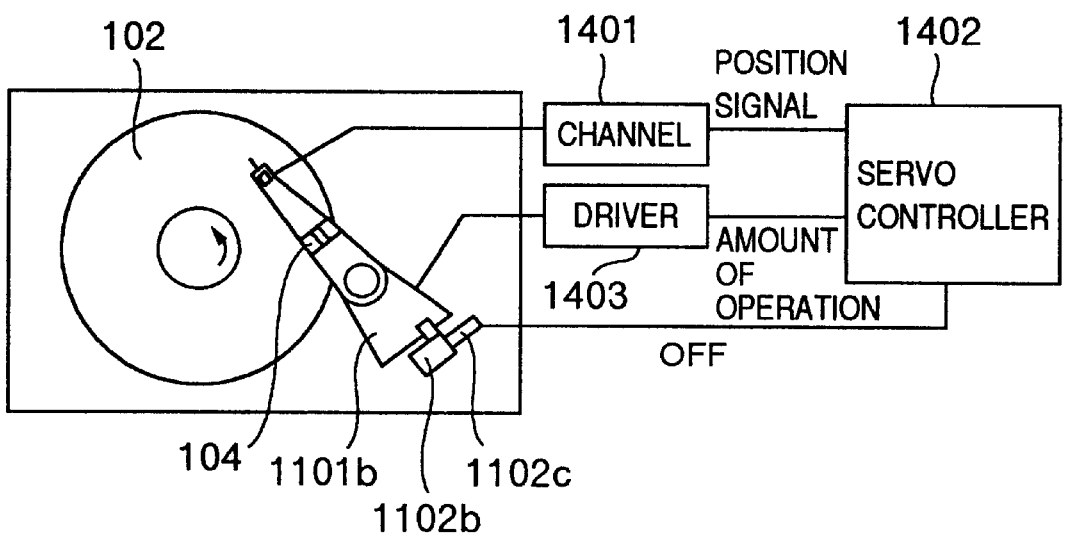

FIG. 14B is a block diagram showing an operation at a time of following to the track. When the head moves on the target track, the controller 1402 turns off the electric current supplied to the solenoid 1102b, the position of the voice coil motor 1101 is kept, and the control system is switched to the control system for following to the track. Since the relative positional relation between the track and the head is oscillated due to the vibration of the spindle or the like at a time when the magnetic disc apparatus is operated, the control system for following to the track drives the fine moving actuator 105 and moves the head 101 in order to make the head 101 follow to the track. The servo controller 1402 at this time calculates an amount of operation of the fine moving actuator 105 on the basis of the position signal obtained by demodulating the servo signal which the head 101 reproduces, by the channel 1401, and gives a command to a driver circuit 1403 for the fine moving actuator.

Since the control system for following to the track is a simple structure comprising single input single output feedback loop but directly detects an amount desired to be controlled so as to drive only the fine moving actuator having a high rigidity, it is possible to realize a following performance which is more excellent than the track following operation by the conventional voice coil motor. Further, as a great advantage of the present embodiment, there is a point that the relative positional relation between the head and the disc is not changed even in the case that the acceleration is applied to the casing from the external portion. This is because an angle of the head supporting mechanism 104 does not change with respect to the casing since the position of the voice coil motor is fixed by the fixing mechanism 1102 in the present embodiment, and a deformation due to the acceleration applied from the external portion can be ignored since the piezoelectric element constituting the fine moving actuator 105 has a high rigidity.

In accordance with the advantage mentioned above, the magnetic disc apparatus in accordance with the present embodiment can perform a recording and reproducing operation even under the existence of the vibration and the impact in which the conventional magnetic disc apparatus can not perform a recording and reproducing operation. Accordingly, even in the devices in which it is hard to achieve a predetermined performance by using the conventional magnetic disc apparatus due to the problem of the vibration, the impact or the like, such as the mobile information terminal device and the on-vehicle information device, it is possible to obtain a high throughput and a high reliability by assembling the magnetic disc apparatus in accordance with the present invention.

Figure 15A:
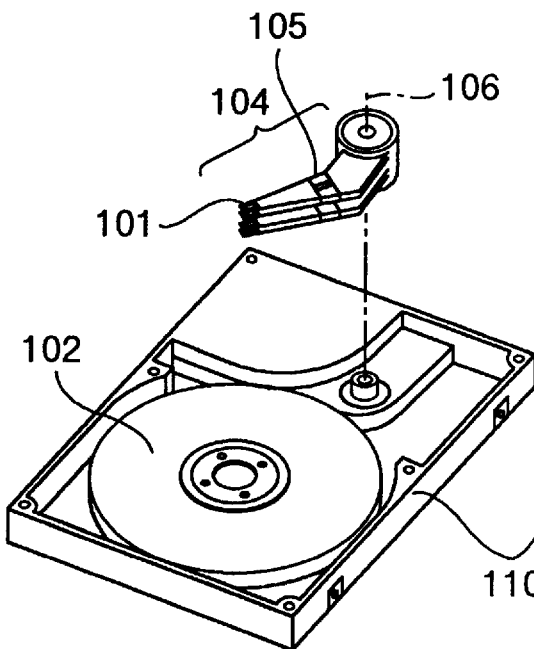
FIG. 15A is a schematic view showing a structure of a magnetic disc apparatus corresponding to a fourth embodiment.
Figure 15B:
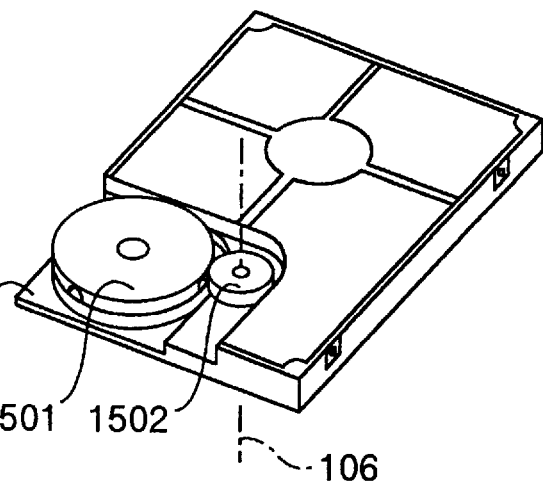
FIG. 15B is a schematic view of a position keeping mechanism in accordance with the fourth embodiment.
Figure 15C:
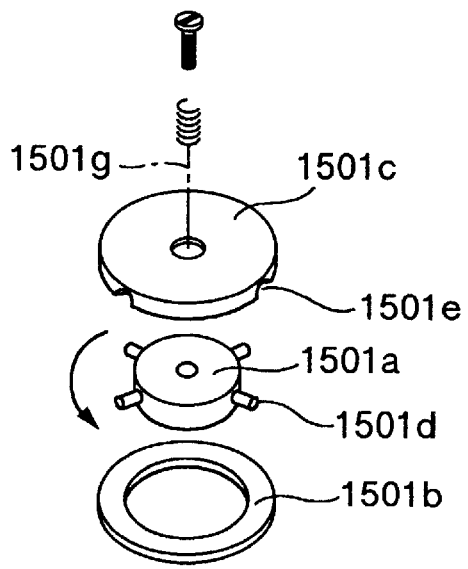
FIG. 15C is an exploded perspective view of the position keeping mechanism in accordance with the fourth embodiment.

Next, a description will be given of a magnetic disc apparatus corresponding to a fourth embodiment in accordance with the present invention with reference to FIGS. 15 and 16. FIG. 15 is a schematic view showing a structure of the magnetic disc apparatus corresponding to the fourth embodiment in accordance with the present invention. FIG. 15A is a schematic view showing a state in which the head positioning mechanism 104 is taken out from the pivot 106 by opening the casing cover. FIG. 15B is a schematic view in the case of seeing the magnetic disc apparatus from the bottom surface side of the cover. FIG. 15C is a schematic view showing a structure of a drive force generating mechanism 1501 provided in the casing in a bottom surface side.

The magnetic disc apparatus in accordance with the fourth embodiment is different from the third embodiment in a point that the coarse moving actuator corresponding to the voice coil motor in accordance with the third embodiment is changed to the drive force generating mechanism 1501 and arranged in a bottom surface side of the casing 110, however, is substantially common in the other portions.

The fourth embodiment employs a rotational force of a motor 1501a as a drive force for rotating the head positioning mechanism 104. A description will be given of a path for transmitting the drive force with reference to FIGS. 15A to 15C.

A rotation of the motor 1501a is transmitted to a movable adsorption member 1501c by a drive force transmitting member 1501d provided in an outer peripheral portion of the motor. The movable adsorption member 1501c is engaged with a pivot axis rotational member 1502 so as to transmit the rotational force. The pivot axis rotational member 1502 is fixed to the head supporting mechanism 104 within the casing via the pivot axis 106, and the rotational motion of the pivot axis rotational member 1502 becomes a rotational motion of the head supporting mechanism.

Figure 16A:
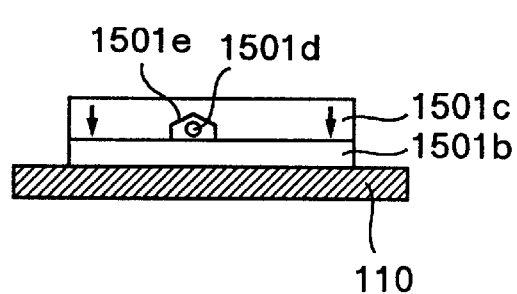
FIGS. 16A and 16B are schematic views showing an operation of a coarse actuator in accordance with the fourth embodiment.

A feature of the present embodiment exists in a matter that the position of the coarse moving actuator is fixed at a time when the head follows to the track as mentioned in the first embodiment. Accordingly, a description will be given of an operation of fixing the position of the coarse moving actuator in the magnetic disc apparatus in accordance with this embodiment with reference to FIG. 16. FIG. 16 is a schematic view in a state of seeing the drive force generating mechanism 1501 from a direction perpendicular to the rotational axis. FIG. 16A shows a state at a time of following the head to the track, and FIG. 16B shows a state at a time of moving the head between the tracks.

A stationary adsorption member 1501b is a permanent magnet fixed to the casing 110, and an opposing movable adsorption member 1501c is a soft magnetic material supported in such a manner as to freely rotate around a rotational axis 1501g. Both elements are adhered to each other due to a magnetostatic force as shown in FIG. 16A when the interior motor 1501a does not move, and a position of the movable adsorption member 1501c is fixed. The track following operation is performed by driving the fine moving actuator 105 in a state that the movable adsorption member 1501c is fixed.

Figure 16B:
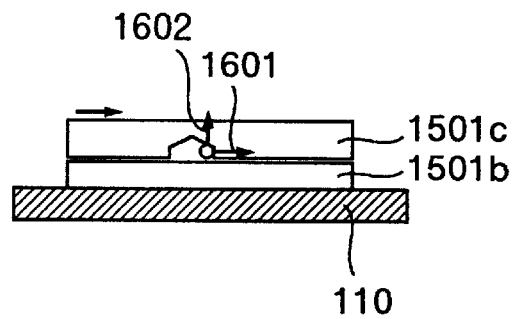

On the contrary, at a time of moving between the tracks, the drive force transmitting member 1501d moves in a direction 1601 due to the rotation of the motor 1501a, as shown in FIG. 16B, and it is brought into contact with a notch 1501e provided in the movable adsorption member 1501c. The notch 1501e is formed so as to have an angle with respect to the rotational direction 1601 of the motor. Due to this shape, the movable adsorption member 1501c is lifted up in a direction 1602 opposing to the magnetostatic force by the force of the drive force transmitting member 1501d so as to move in the rotational direction 1601. By stopping the rotation of the motor 1501a, the movable adsorption member 1501c is again returned to the state shown in FIG. 16A, the position of the movable adsorption member 1501c is fixed and the position of the head positioning mechanism 104 is fixed.

In accordance with the structure mentioned above, it is possible to arrange the mechanism for generating the drive force and the mechanism for fixing the position in the outer portion of the magnetic disc apparatus casing, and it is possible to flexibly select a motor material and an adsorption member material without being restricted by the severe conditions within the casing relating to the dusts, the chemical reaction or the like.

Figure 17:
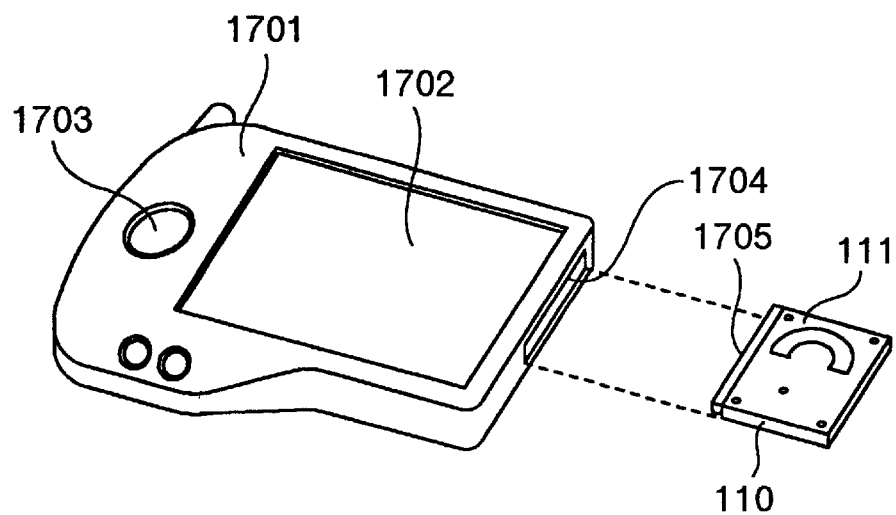
FIG. 17 is a schematic view of a whole structure of a mobile information device in which the magnetic disc apparatus is installed.

FIG. 17 is a schematic view showing an outer appearance of a mobile information device employing the disc apparatus mentioned above.

In the information device, a display panel 1703 for inputting by way of a pen or a finger touch is provided in an information device casing 1701. Further, a display selecting key 1703 or the like is provided in the information device casing 1701, in addition to a power source switch, so that it is possible to select a display content by operating the selecting key. Further, an insertion port 1704 for inserting the magnetic disc apparatus in which the casing 110 installing the magnetic disc and the upper cover 111 are mounted is provided in a side surface of the information device casing 1701. An interface connector 1705 for connecting to a control circuit within the information device is provided in the magnetic disc apparatus.

In the structure mentioned above, in the case that an external force is applied to the information device and the external force is further applied to the disc apparatus when the disc apparatus assembled within the information device records or reproduces the information, the suspension is supported by the holding mechanism and is not largely shifted from the disc surface, so that it is possible to record and reproduce at a high accuracy and at a high speed.

In accordance with the present invention, since the relative position between the head and the disc is maintained even when the acceleration due to the vibration and the impact is applied to the magnetic disc apparatus from the external portion, it is possible to prevent the head position from being shifted from the track which generates an interruption of the recording and reproducing operation, the breaking of the data and the erroneous reading, and it is possible to improve a throughput and a reliability of the magnetic disc apparatus. Further, by employing the magnetic disc apparatus in accordance with the present invention, it is possible to improve a data processing performance and a reliability in the mobile information device such as the portable information terminal device, the on-vehicle information device or the like.

What is claimed is:

1. A magnetic disc apparatus comprising:
   a recording medium in which a track constituted by a set of data is formed on a recording surface;
   a recording and reproducing element recording and reproducing the data on said track;
   a head supporting mechanism supporting a head provided with said recording and reproducing element; and
   an actuator constituted by a movable portion connected to said head supporting mechanism and a stationary portion fixed to a casing;
   wherein the magnetic disc apparatus is provided with a holding mechanism for holding the movable portion of said actuator driving said head supporting mechanism at a fixed position while an input command value is constant; and
   wherein said holding mechanism brings a member fixed to said casing side into contact with said movable portion so as to keep a position of said actuator at an optional position.

2. A magnetic disc apparatus as claimed in claim 1, wherein said actuator includes a coarse moving actuator for coarsely moving said head supporting mechanism at a high speed and a fine moving actuator provided in said head supporting mechanism for finely moving said head so as to position said head.

3. A magnetic disc apparatus comprising:
   a recording medium in which a track constituted by a set of data is formed on a recording surface;
   a recording and reproducing element recording and reproducing the data on said track;

a head supporting mechanism supporting a head provided with said recording and reproducing element; and an actuator constituted by a movable portion connected to said head supporting mechanism and a stationary portion fixed to a casing;

wherein the magnetic disc apparatus is provided with a holding mechanism for holding the movable portion of said actuator driving said head supporting mechanism at a fixed position while an input command value is constant; and wherein said holding mechanism has two said actuators and is structured such that the respective actuators apply a drive force in a direction of keeping the head supporting mechanism at a fixed position.

4. A magnetic disc apparatus as claimed in claim 3, wherein said actuator has a plurality of teeth and grooves in a stationary element side and is provided with a coil having teeth and grooves in such a manner as to oppose to said stationary element and applying an electric current.

5. A magnetic disc apparatus comprising:

a recording medium in which a track constituted by a set of data is formed on a recording surface;

a recording and reproducing element recording and reproducing the data on said track;

a head supporting mechanism supporting a head provided with said recording and reproducing element; and an actuator constituted by a movable portion connected to said head supporting mechanism and a stationary portion fixed to a casing;

wherein the magnetic disc apparatus is provided with a holding mechanism for holding the movable portion of said actuator driving said head supporting mechanism at a fixed position while an input command value is constant; and wherein said actuator includes a coarse moving actuator for coarsely moving said head supporting mechanism at a high speedand a fine moving actuator provided in said head supporting mechanism for finely moving said head so as to position said head.

6. A magnetic disc apparatus comprising:

a magnetic disc provided with a recording surface for recording data;

a magnetic head moving on said recording surface so as to record and reproduce the data;

a magnetic head supporting mechanism supporting said magnetic head; and a coarse moving actuator connected to said magnetic head supporting mechanism and positioning the magnetic head to a predetermined position, wherein said actuator is provided with two drive portions for driving said magnetic head supporting mechanism in a rotational direction and a reverse-rotational direction of said magnetic disc, said drive portion is constituted by a stationary element fixed to a casing of the disc apparatus and provided with a plurality of teeth and a movable element provided in a magnetic head supporting mechanism side and having a plurality of teeth so as to oppose to the teeth of said stationary element, and said magnetic head supporting mechanism is moved and held at a fixed position by applying a predetermined voltage to said movable element.

* * * * *